Figure 1:
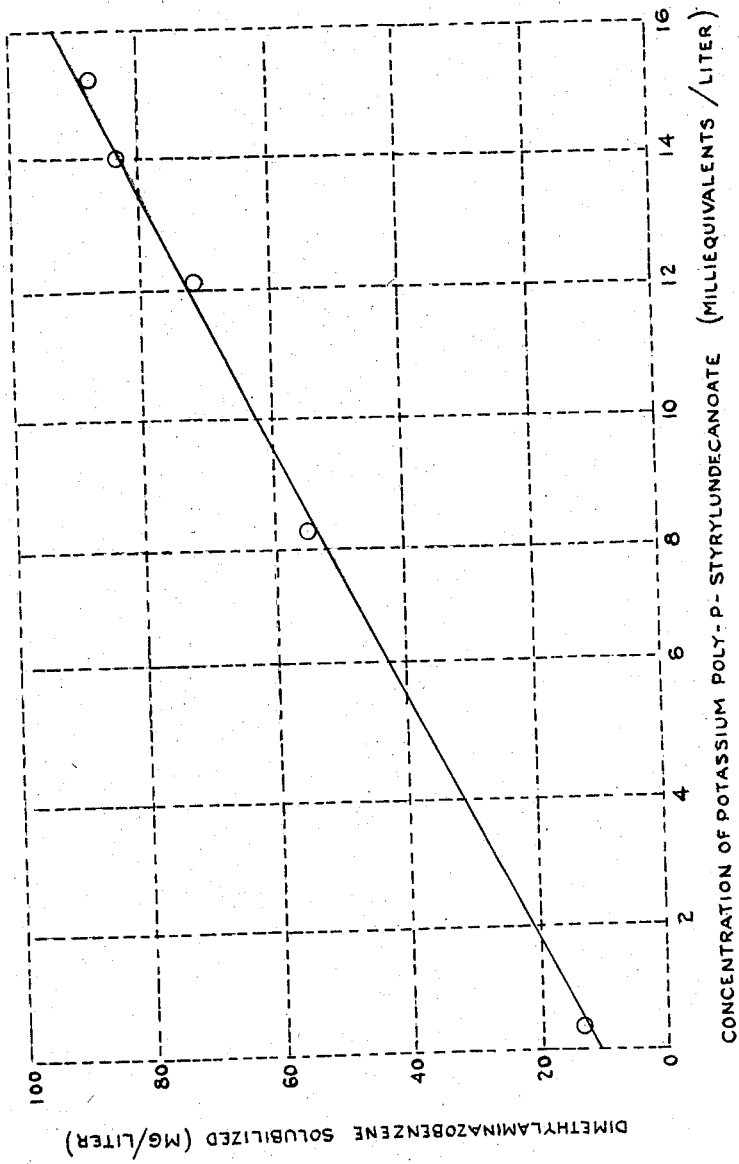

REDUCED VISCOSITY VS. CONCENTRATION
IN ACETONE FOR POLY-P-STYRYLUNDECANDIC ACID

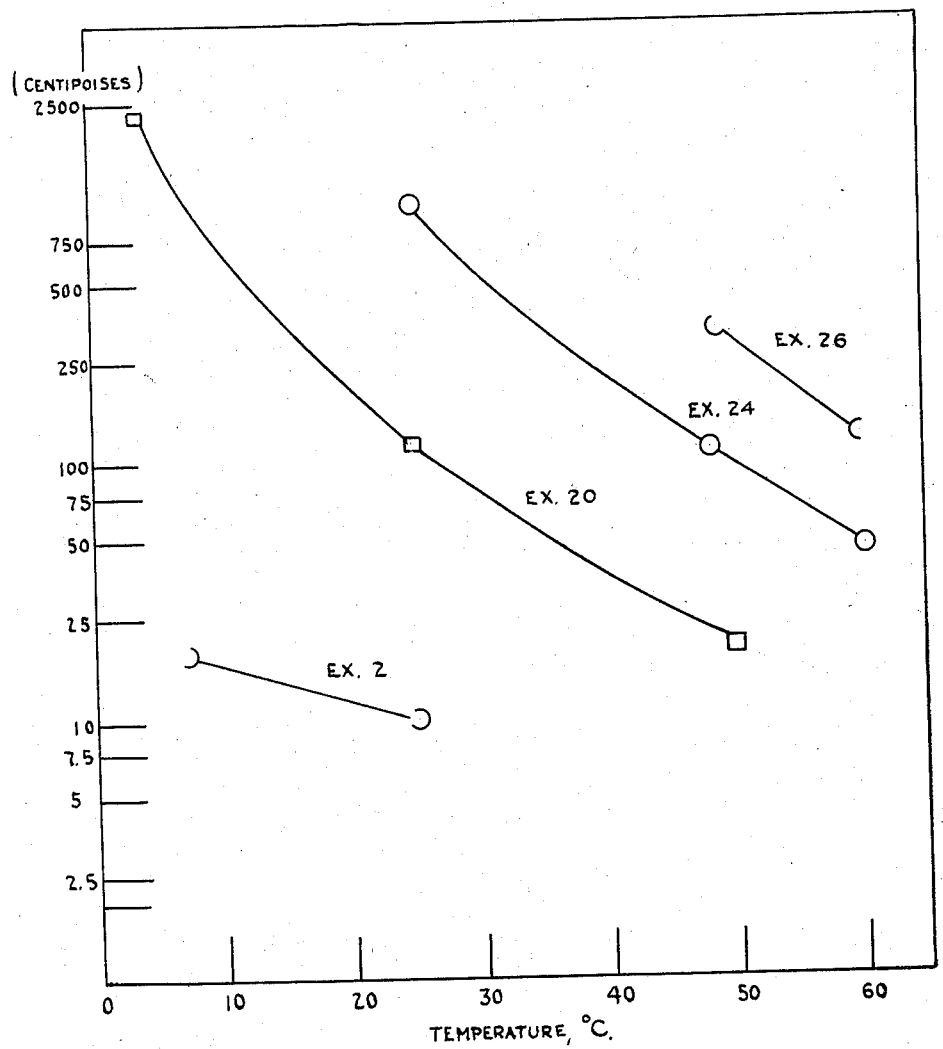
FIG. 3. VISCOSITY – TEMPERATURE RELATIONSHIPS OF AQUEOUS POLY-SOAP SOLUTIONS (10%). ALL VISCOSITIES DETERMINED WITH BROOKFIELD VISCOMETER AT 60 RPM.

2,874,151

POLYMERIC EMULSIFYING AGENTS AND THEIR DERIVATIVES

Avrom I. Medalia, Belmont, and Harold H. Freedman, Brookline, Mass.

Application June 28, 1955, Serial No. 518,483

17 Claims. (Cl. 260—80)

This invention relates to a composition of matter belonging both to the class of high polymers and to the class of soaps; in short, to poly-soaps. This invention also relates to the processes of producing materials of this composition by polymerization of compounds of a class known as vinyl emulsifying agents, recently described in copending applications Serial No. 389,870, filed November 2, 1953, and co-pending application Serial No. 464,116, filed October 22, 1954, of which this application is a continuation-in-part; or by polymerization of derivatives of the vinyl emulsifying agents, followed by conversion of the derivative to the polymerized emulsifying agent, or by addition of side-chains to already-formed vinyl polymers in such a way as to convert some of the base units of these polymers to vinyl emulsifying agents or their derivatives.

The class of vinyl emulsifying agents consists of emulsifying agents which contain a $CH_2=C<$ group, where at least one of the disconnected valences is attached to an electro-active group, that is, a group which substantially increases the electrical dissymmetry or polar character of the molecule. Such groups include phenyl, chloro, cyano, vinyl, acetoxy, acyl, aroyl, ether, etc.; that is, the groups which, when directly attached to a vinyl group, form compounds of the class known as vinyl monomers, as described at length by C. G. Schildknecht, "Vinyl and Related Polymers," Wiley, New York, 1952. Thus, a typical vinyl monomer is styrene

in which the phenyl group is directly attached to a vinyl group. Commonly known derivatives of styrene, which are likewise vinyl monomers, include vinyl toluene

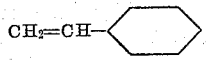

p-chlorostyrene

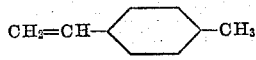

p-tert-butylstyrene

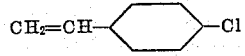

etc.

A vinyl emulsifying agent which may be regarded as a derivative of styrene is potassium 10-(p-styryl)undecanoate,

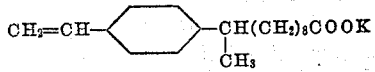

In this compound, as in the other derivatives of styrene listed above, the vinyl group is attached to a phenyl (or more precisely, a p-phenylene) group. The unique structural feature of the compound, as contrasted with previously known vinyl monomers, is that there is also attached to the p-phenylene group a hydrocarbon chain terminating in a carboxylic salt. This unique structural feature imparts to the compound a property hitherto unknown among vinyl monomers, namely that of being an emulsifying agent.

The fundamental properties and structural features of emulsifying agents have been discussed by many authors. In brief, and for the purposes of these Letters Patent, an emulsifying agent will be taken as a compound from which a stable solution can be formed in a concentration of at least 0.1 M in water at 50° C. and which exhibits a critical concentration as determined by dye solubilization of 0.05 M or less, in pure water at 50° C. Structurally, an emulsifying agent comprises a hydrophobic portion and a hydrophilic portion. The hydrophobic portion consists generally of a hydrocarbon chain of at least 9 carbon atoms, with or without hydrocarbon side chains; a p-phenylene group included in the hydrocarbon chain counts for 4 carbon atoms. The hydrophilic portion of the emulsifying agent may consist of an alkali metal carboxylate, —COOK; an ammonium or substituted ammonium carboxylate, —$COONH_4$ or —$COONH_2(CH_3)_2$; an alkali metal sulfonate, —$SO_3Na$; an alkali metal sulfate, —$OSO_3Na$; a polyoxyethylene carboxylate,

—$COOCH_2CH_2OCH_2CH_2OCH_2CH_2OH$ a trialkylammonium halide, —$N(CH_3)_3Cl$; and many other groups. No all-inclusive structural definition can be given for hydrophilic groups; rather, the class of hydrophilic groups will be understood in the present Letters Patent to refer to such groups as have been used in the art as the water-solubilizing group of water-soluble emulsifying agents. The hydrophilic group may be joined directly to the hydrophobic group; or through an intermediate linkage, such as an ester, amide, ether, etc. In the present Letters Patent, the intermediate linkage, if used, will be conceived of as being part of the hydrophilic group.

The above discussion should clarify the above definition of a vinyl emulsifying agent. For purposes of illustration, the following compounds may be cited as typical vinyl emulsifying agents; potassium 10-p-styryl undecanoate; triethylene glycol mono-10-(p-styryl) undecanoate; sodium 5-(p-styryl)hexanoate; sodium 10-(p-styryl) octadecanoate; sodium 13-chloro-13-tetradecene sulfonate; sodium 13-oxa-14-keto-15-hexadecene sulfate; potassium 14-oxa-15-hexadecenoate; ammonium 14 - vinyl-14 - pentadecanoate; potassium 10 - (p - acrylphenyl) undecanoate; sodium pentadec-12-yne-14-enoate; potassium 13-keto-14-pentadecanoate; potassium 12-acrylamidostearate.

In common with other vinyl monomers, the vinyl emulsifying agents undergo polymerization, which may take place by a free radical mechanism. An example of the polymerization of a derivative of a vinyl emulsifying agent was given in the copending application, Serial No. 389,870; namely, the polymerization of p-styryl undecanoic acid on standing in the presence of light and air. Further illustrations of the polymerization of the vinyl emulsifying agents or simple derivatives are given below.

A polymer thus formed consists essentially of a large number of molecules of emulsifying agent joined together by chemical bonds. The monomeric emulsifying agent may thus be said to constitute the "base unit" or "building block" of the polymer. The polymer may also be regarded as a micelle held together by primary valence bonds. Such a polymer (potassium poly-p-styrylundecanoate) is shown in I.

I

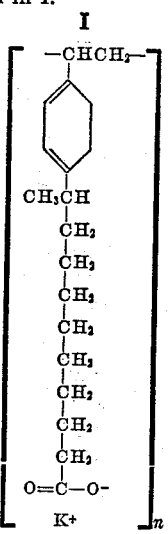

The best-known type of emulsifying agent is a soap, which is the alkali metal salt of a carboxylic acid, RCOOH, where the group R is a hydrocarbon containing from approximately 9 to approximately 24 carbon atoms. For convenience, therefore, many of the monomers which have been referred to above as vinyl emulsifying agents may be termed vinyl soaps; and the polymers which form the subject of the present invention may be termed poly-soaps.

It has been found that not only are the vinyl emulsifying agents new and novel materials but that their polymers, particularly the poly-soaps, are also new and novel, and no preparations of similar materials are known.

Products have been prepared by Strauss et al. (Journal Polymer Sci. 9, 509 (1952)), which these authors refer to as poly-soaps; but actually these products are not poly-soaps in the sense used in this application. The Strauss polymers are cationic rather than anionic, and for this reason their utility would be limited. The base units of the Strauss polymers consist essentially of a long hydrophobic molecule with a hydrophilic (cationic) group located in a central position, thus differing fundamentally from the base units of the polymers of the present invention, in which the hydrophilic group is terminally attached to the hydrophobic molecule.

Novel polymeric emulsifying agents can also be made by replacing the alkali metal carboxylate group with some other hydrophilic group. Such groups include those described above and in general, those groups which have been used in the art as the water-solubilizing groups of water-soluble emulsifying agents. The novelty of the present invention lies in the polymeric nature of the emulsifying agent with a terminally attached hydrophilic group and not in the use of a specific water-solubilizing group. General structure formulae of these poly-soaps are:

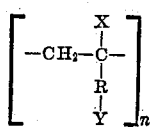

and

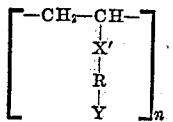

where X and X′ represent electro-active groups with one or two disconnected valences, respectively (such as —C≡N and

respectively); R represents a hydrophobic group; and Y represents a hydrophilic group. A typical polymeric emulsifying agent of the non-ionic type would be methoxy polyoxyethylene poly-p-styrylundecanoate (II):

II

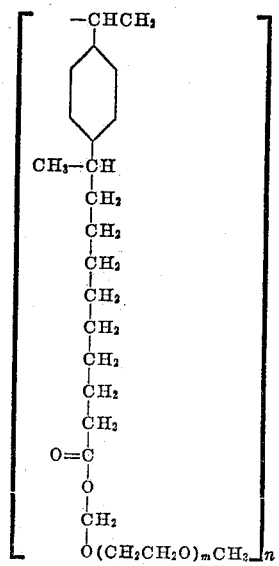

Where m has an average value of 15 to 20, sufficiently high to render the entire polymer water-soluble.

In the following specifications, the vinyl emulsifying agents referred to are characterized as follows: p-styrylundecanoic acid is a compound of structure

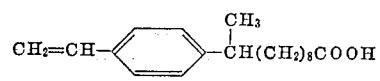

the preparation of which has been described in co-pending application Serial No. 389,870, filed November 2, 1953. 10-acrylamidostearic acid is the reaction product of acrylonitrile with oleic acid, according to the method of Roe and Swern (J. Am. Chem. Soc., 75 5479 (1953)). 12-acrylamidostearic acid is the reaction product of acrylonitrile with 12-hydroxystearic acid (hydrogenated ricinoleic acid) prepared by the same procedure. Acrylamidoundecanoic acid is the crude reaction product of acrylonitrile with 10-undecenoic acid, prepared by the same procedure. On repeated recrystallization of acrylamidoundecanoic acid, a crystalline solid is obtained, M. P. 108°–112° C.; this is referred to as 11-acrylamidoundecanoic acid, since infrared absorption indicates that it is substantially this pure isomer, whereas the crude product is a mixture of 10- and 11-acrylamidoundecanoic acids. p-Acrylylphenylundecanoic acid is a compound of structure

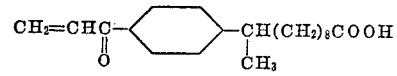

The activating groups attached to the vinyl groups of p-styrylundecanoic acid, the acrylamido compounds, and p-acrylylphenylundecanoic acid are, respectively, the phenyl group, the amide group, and the phenyl ketone group. These vinyl emulsifying agents fall, respectively, in the classes of substituted styrenes, of substituted acrylamides, and of substituted aromatic vinyl ketones.

A base unit of a poly-soap formed from the potassium soap of the first of the above-listed vinyl emulsifying agent acids has been shown above (I). Base units of poly-soaps formed from the potassium soaps of the remaining vinyl emulsifying agent acids are as follows:

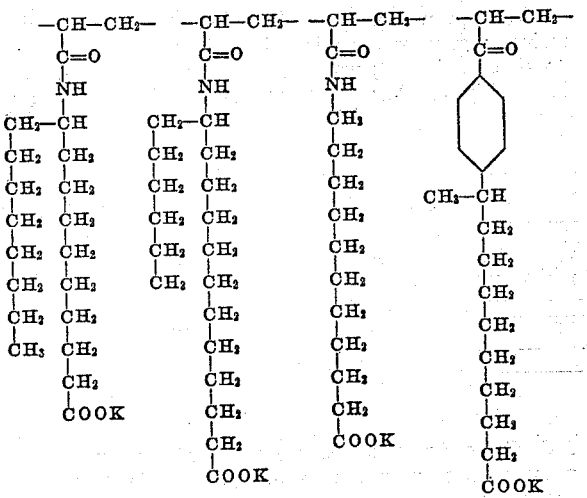

| Base units potassium poly-10-acrylamidostearate | Base units potassium poly-12-acrylamidostearate | Base units potassium poly-11-acrylamidoundecanoate | Base units potassium poly-p-acrylylphenylundecanoate |

The polymerization of the above-listed vinyl emulsifying agents has been accomplished according to a free-radical mechanism using several different techniques. In several of the examples, the potassium or sodium vinyl emulsifying agent was prepared in aqueous solution and the poly-soap was formed by heating in the presence of a source of free radicals (initiator). In other examples, transformation of the monomeric soap to the poly-soap took place in an organic solvent. In other examples, this transformation took place in an aqueous emulsion of a water-immiscible organic liquid. In other examples, the acid form of the vinyl emulsifying agent was polymerized, in bulk, yielding a poly-acid, from which the poly-soap could be prepared by reaction with alkali. Polymerization of the acid was also carried out in solution in an organic solvent, and in an aqueous emulsion both in the absence and in the presence of an added organic solvent. Polymerization of the methyl ester was also carried out, yielding a poly-ester, which could be converted to the poly-soap by saponification.

Copolymerization of the soap and of the acid forms of vinyl emulsifying agents with simple monomers has also been carried out, yielding copolymer soaps or acids.

Polystyrene has been modified by the addition of side-chains in such a way as to form a copolymer ester which was then saponified to form the copolymer soap.

It is an object of the present invention to provide new compositions of matter which have unique properties as emulsifying agents, as polymers, and in other regards. It is a further object to show methods by which these compounds can be prepared. Further objects will become apparent from consideration of the examples.

EXAMPLES OF PREPARATION OF POTASSIUM POLY-p-STYRYLUNDECANOATE

*Example 1*

A solution of potassium p-styrylundecanoate (2.88%) was prepared by mixing equivalent amounts of p-styrylundecanoic acid and potassium hydroxide in water, together with 0.21% of potassium persulfate. The gas space was flushed with nitrogen and the solution was shaken at 50° C. for 4 hours. The solution was then examined for monomeric potassium p-styrylundecanoate by ultraviolet absorption at a wave-length of 253 mµ which is characteristic of the vinyl group conjugated with the benzene ring. Less than 2% of the original monomer was present, indicating a conversion of at least 98% to the polymer. This solution of poly-soap (2.88%) had a surface tension of 58.2 dynes/cm., in contrast to a solution of monomeric potassium p-styrylundecanoate which has a surface tension of 38.3 dynes/cm. at a concentration of 3.4%, 36.2 dynes/cm. at 0.34%, and 42.6 dynes/cm. at 0.034%.

A portion of this poly-soap solution was heated at 80° C. for 4 hours in order to destroy the persulfate. The solubilization of an orange dye, p-dimethylaminoazobenzene, was then investigated in solutions of potassium poly-p-styrylundecanoate of various concentrations prepared by dilution of the above solution. The amount of dye solubilized was found to be a linear function of the concentration of poly-soap, from a concentration of poly-soap of 0.001 N to 0.016 N, the relationship being 5 mg./liter of dye solubilized per 1 milliequivalent/liter of poly-soap at 50° C. (Fig. 1). In contrast to ordinary soaps, solubilization takes place even at vanishingly low concentrations of poly-soap; i. e., the "critical micelle concentration" of the poly-soap is zero. Similar results have been found with a different sample of potassium poly-p-styrylundecanoate, at 38° C.; at this temperature the amount of dye solubilized is 4 mg./liter per 1 milliequivalent/liter of poly-soap. Samples of potassium poly-12-acrylamidostearate have also given this same solubilization behavior with zero critical concentration, and a value of 4 mg./liter of dye solubilizer per 1 milliequivalent/liter of poly-soap, at 38° C. In contrast, the monomeric potassium 12-acrylamidostearate has a critical concentration of 8 milliequivalents per liter, and a solubilization of dye of 2.5 mg./liter per 1 milliequivalent/liter of soap, at 38° C.

Reduced viscosities of diluted aqueous solutions of this sample of potassium poly-p-styrylundecanoate were determined with an Ostwald viscomeeter. Reduced viscosity, η red, is given by the formula $$\eta_{red} = \frac{\eta_s - 0}{\eta_0 c}$$

where $\eta_s$ and $\eta_0$ are the kinematic viscosities of the polymer solution and of the solvent, respectively, and $c$ is the concentration of the polymer solution (g. polymer per 100 ml. of solution). As shown in Table I, the reduced viscosity increases with decreasing concentration. This behavior is typical of polyelectrolytes.

TABLE I

[Reduced viscosity of aqueous solutions of potassium poly-p-styrylundecanoate at 25° C.]

| Concentration (g.polymer/100 ml.) | Reduced Viscosity |
|---|---|
| 2.54 | 0.0874 |
| 0.635 | 0.0914 |
| 0.254 | 0.093 |
| 0.127 | 0.15 |

*Example 2*

A solution of potassium p-styrylundecanoate was prepared as follows: p-styrylundecanoic acid, 20 g.; potassium hydroxide, equivalent: potassium persulfate, 0.6 g.; water, 200 g. Polymerization of the nitrogen-flushed solution was effected by heating 19 hours at 50° C. The surface tension of the aqueous solution at various concentrations was found to be as follows: 10%, 57.4 dynes/cm.; 3.4%, 62.5 dynes/cm.; 0.34%, 70.2 dynes/cm. By way of comparison, the surface tension of aqueous solutions of the monomeric soap (potassium p-styrylundecanoate) is as follows: 3.4%, 38.3; 0.34%, 36.2; 0.034%, 42.6 dynes/cm. Viscosities of the aqueous solution of the poly-soap are shown in Fig. 3.

The poly-acid was precipitated by the addition of acetic acid, and was dried and then dissolved in methanol. The reduced viscosity at 25.0° C. of a 0.45% solution was 0.456.

Examples 3–9

In order to determine the effect of various conditions of preparation upon the molecular weight of the polymer formed by aqueous solution polymerization of potassium or sodium p-styrylundecanoate, charges were prepared according to the following recipes.

[Parts by weight]

| Example | 3 | 4 | 5 | 6 | 7 | 8 | 9 |
|---|---|---|---|---|---|---|---|
| p-Styrylundecanoic acid | 3.57 equiv. | 3.57 ½ equiv. | 1.00 equiv. | 3.57 equiv. | 3.57 equiv. | 3.57 equiv. | 3.57 equiv. |
| KOH | | | | | | | |
| Water | 100 | 100 | 100 | 100 | 100 | 100 | 100 |
| t-Dodecyl mercaptan | | | | 0.3 | | | |
| $K_2S_2O_8$ | 0.3 | 0.3 | 0.3 | 0.3 | | | |
| AIBN [a] | | | | | 0.2 | 0.2 | 0.05 |
| KCl | | | | | | 0.165 | |

[a] Bis-azoisobutyronitrile.

All charges were shaken for 19 hours at 50° C. to bring about complete conversion of the monomeric soap to the poly-soap. The poly-acids were then precipitated with 0.5 N hydrochloric acid and purified as follows. Each poly-acid was dissolved in acetone and re-precipitated with water, in order to remove traces of salts. After drying, the poly-acid was again dissolved in acetone and re-precipitated with toluene, in order to remove traces of unpolymerized monomers. The polymer was then dried and re-dissolved in acetone for viscosity measurement. The results are given in Fig. 2 and Table II; these data are discussed following Example 17.

Example 10

A charge was prepared as follows: p-styrylundecanoic acid, 3.57 parts; potassium hydroxide, equivalent; water, 100 parts; benzene, 17.6 parts; potassium persulfate, 0.3 part. The charge was shaken for 18 hours at 50° C. and was then centrifuged to separate the aqueous layer from the benzene layer. A total solids determination showed that all the soap remained in the aqueous layer. The surface tension of the aqueous layer was 61.2 dynes/cm. The reduced viscosities of the aqueous solution at concentrations of 1.0%, 0.5%, and 0.2%, respectively, were 0.207, 0.183, and 0.178.

The poly-acid was precipitated by addition of 0.5 N hydrochloric acid, and purified as in Examples 3–9. Viscosity data are given in Fig. 2 and Table II.

Example 11

A charge was prepared as in Example 10 except that the amount of potassium hydroxide taken was sufficient to neutralize only 50% of the p-styrylundecanoic acid. Further treatment of this charge was carried out as in Example 10. The surface tension of the aqueous layer was 67.0 dynes/cm. The reduced viscosities of the aqueous solution at concentrations of 0.98%, 0.49%, and 0.20%, respectively, were 0.042, 0.047, and 0.052. Viscosity measurements of the acetone solution of the polymer, purified as in Example 10, are reported in Fig. 2 and Table II.

Example 12

Potassium p-styrylundecanoate was polymerized in methanol solution according to the following recipe: p-styrylundecanoic acid, 3.57 parts; potassium hydroxide, equivalent; methanol, 79 parts; AIBN, 0.2 part. The charge was kept at 60° C. for 150 hours to bring about nearly complete polymerization (92% conversion as determined spectrophotometrically). The reduced viscosity of this methanolic poly-soap solution at a concentration of 4.02 g. of poly-soap per 100 cc. of solution was 0.242; at 1.0%, the reduced viscosity was 0.233; while on acidification with excess acetic acid, the reduced viscosity of the 0.89% solution was 0.200.

Example 13.—Preparation of sodium poly-p-styrylundecanoate

A charge was prepared according to the following recipe: p-styrylundecanoic acid, 3.57 parts; sodium hydroxide, equivalent; water, 100 parts; potassium persulfate, 0.3 part. The charge was shaken for 19 hours at 50° C. to bring about complete conversion of the monomeric soap to the poly-soap. Precipitation, purification, and viscosity of the poly-acid was carried out as in Examples 3–9; the data are included in Fig. 2 and Table II.

EXAMPLES OF PREPARATION OF POLY-p-STYRYLUNDECANOıC ACID

Example 14

Figure 2:
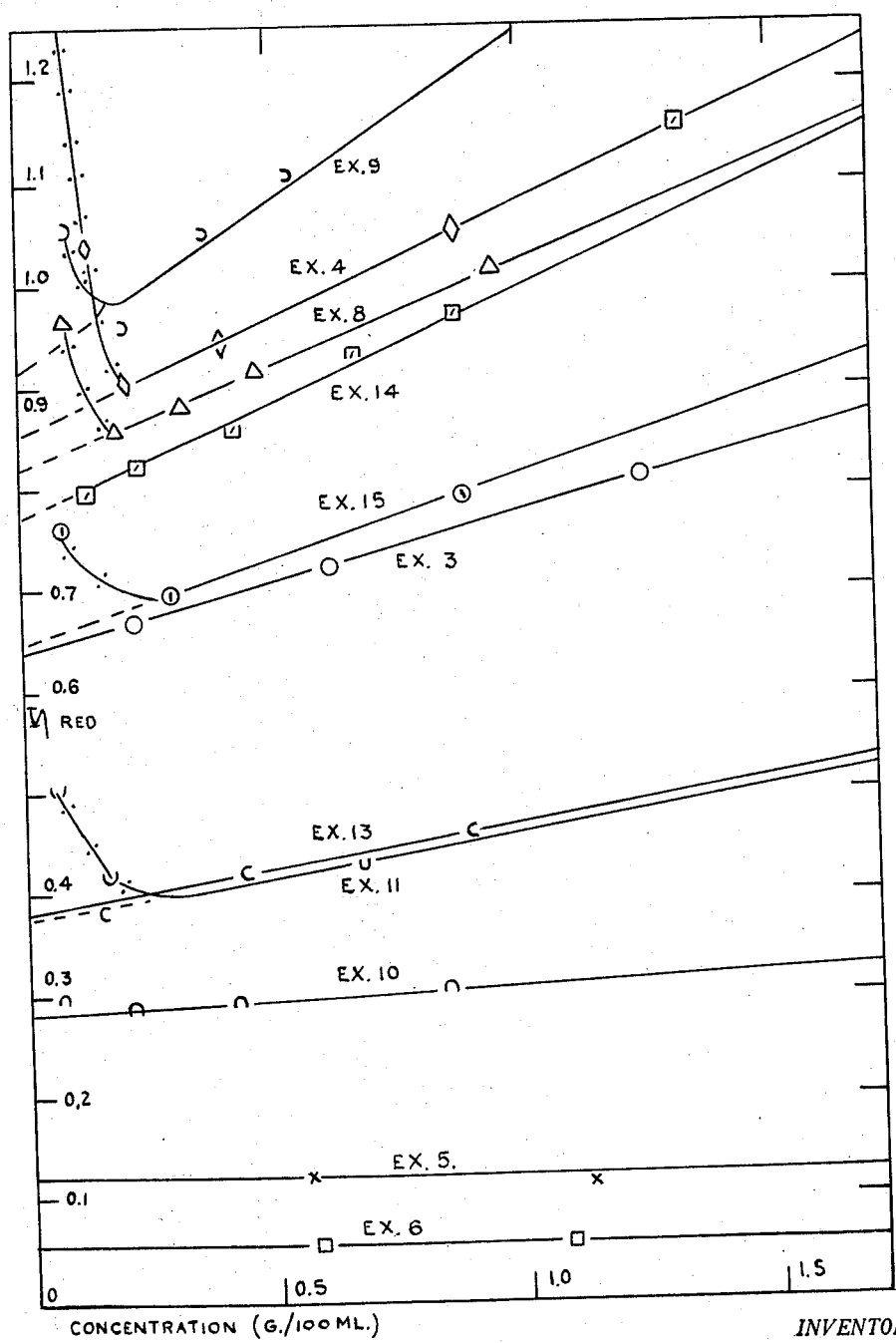

In this example, poly-p-styrylundecanoic acid was prepared by emulsion polymerization of styrylundecanoic acid in an acidified aqueous emulsion, using the sodium salt of an alkyl aryl polyether sulfonate (Triton X-200, Rhom and Haas Co.) as emulsifying agent. The charge was as follows: p-styrylundecanoic acid, 20 parts; acetic acid, 1.0 part; Triton X-200, 3.0 parts of the commercial aqueous dispersion (28% active); water, 100 parts; AIBN, 0.05 part; Tamol N (sodium salt of a condensed aryl sulfonic acid, Rohm and Haas Co.), 0.5 part (added as an auxiliary colloid stabilizing agent). The charge was shaken at 50° C. for a total of 113 hours, with the addition of a further 0.1 part of AIBN after 45 hours. During this time a small amount of polymer separated from the emulsion. The emulsion, or latex, was coagulated by the addition of an approximately equal amount of saturated sodium chloride. After washing with water, the polymer was dissolved in acetone and re-precipitated with water; then re-dissolved in acetone and re-precipitated with water; then re-dissolved in acetone and re-precipitated with toluene; then dried and re-dissolved in acetone for viscosity measurement. The results are shown in Fig. 2 and Table II.

Example 15

In this example the charge was the same as in Example 14 except that 20 parts of benzene was included in the charge in order to facilitate the emulsification of the viscous styrylundecanoic acid. Further treatment of the charge, as well as the coagulation and re-precipitation of the polymer, was carried out as in Example 14. Viscosity data are given in Fig. 2 and Table II.

Example 16

A solution was prepared containing 2.01 g. of p-styrylundecanoic acid, 0.006 g. of bis-azoisobutyronitrile, and 100 ml. of methanol. This solution was flushed with nitrogen and kept at 60° C. for a total of 200 hours, with four further additions of 0.006 g. quantities of bis-azoisobutyronitrile. The disappearance of monomer was followed spectrophotometrically as in Example 1, and it was found that roughly 20% of the monomer was converted to polymer after each addition of the initiator (bis-azoisobutyronitrile), so that the final conversion was 84%. The limiting reduced viscosity of the methanol solution at 25° C. was 0.046.

Example 17

In a small vial was placed 4.0 g. of p-styrylundecanoic acid and 20 mg. of bis-azoisobutyronitrile. The vial was flushed with nitrogen and kept at 60° C. After 2 hours the liquid was quite viscous. After 24 hours the liquid had changed to a clear sticky gel. Infrared spectra demonstrated the presence of some unreacted monomer in this gel. On further standing at room temperature the polymer changed to a hard clear glass. The reduced viscosity of a 0.26% solution of this polymer in acetone was 0.91.

EXAMPLES OF PREPARATION OF POTASSIUM POLY-p-STYRYLUNDECANOATE FROM THE POLY-ACID OR THE POLY-ESTER

Example 18a

A sample of poly-p-styrylundecanoic acid was prepared by bulk polymerization, following the technique of Example 17, but using 2.0 g. of p-styrylundecanoic acid and 20 mg. of AIBN, and keeping the mixture at 70° C. for 30 hours. At this higher temperature some cross-linking took place, so that the polymer was only 50% soluble in methanol. The ultraviolet spectrum showed that 2% of the monomer remained unpolymerized. The methanol solution of the soluble portion of the poly-acid was titrated with 0.10 N aqueous potassium hydroxide, to a phenolphthalein end-point. In this way the poly-acid was converted to the poly-soap. The equivalent weight of the poly-acid as shown by this titration was 277, in satisfactory agreement with the true equivalent weight of the base units (288). The solution of the poly-soap was evaporated to dryness, forming a transparent glassy film. This dried poly-soap was only partially soluble in water.

Example 18b

A sample of methyl-p-styrylundecanoate was polymerized in bulk by heating at 70° C. for 21 hours in the presence of 0.5% of bis-azobutyronitrile. A 0.526-g. portion of this poly-ester was dissolved in 3 ml. of n-butanol, and to it was added 3 ml. of 1.81 N potassium hydroxide in n-butanol. The mixture was kept at the refluxing temperature (approximately 130° C.) for 2 hours; at this temperature the mixture was a clear solution at all times. On cooling, the poly-soap precipitated. The mixture was diluted with isopropanol, which did not dissolve the poly-soap. The excess potassium hydroxide was titrated with 0.253 N hydrochloric acid in isopropanol to a phenolphthalein end-point. At this end-point the excess potassium hydroxide is neutralized but the poly-soap is not altered. The results of the titration showed that 3.40 milliequivalents of potassium hydroxide had reacted per gram of poly-ester. Within the limits of error (5%) this showed that the poly-ester had been completely converted to the poly-soap during the heating with excess alkali.

In order to purify the poly-soap prepared in the above manner, the poly-soap which was precipitated on addition of isopropanol was collected, dissolved in water, and precipitated as the poly-acid by addition of excess hydrochloric acid; the poly-acid was collected, dissolved in methanol, and titrated to a phenolphthalein end-point, with potassium hydroxide, thus forming a methanol solution of the purified poly-soap.

TABLE II

[Reduced and intrinsic viscosities of poly-p-styrylundecanoic acid solutions in organic solvents at 25° C.]

| Example | Conditions of Polymerization | Solvent | Conc.[a] | $\eta_{red}$ | M[b] |
|---|---|---|---|---|---|
| 2 | Aqueous, K-soap, persulfate | Methanol | 0.45 | 0.456 | |
| 3 | do | Acetone | Int | 0.640 | 1,100,000 |
| 4 | Aqueous, K-soap, ½ neutralized | do | Ext | 0.850 | 1,700,000 |
| 5 | Aqueous, K-soap, (dilute) | do | Int | 0.120 | 68,000 |
| 6 | Aqueous, K-soap, mercaptan | do | Int | 0.055 | 18,000 |
| 7 | Aqueous, K-soap, AIBN | do | Int | 0.765 | 1,500,000 |
| 8 | do | do | Ext | 0.815 | 1,600,000 |
| 9 | do | do | Ext | 0.915 | 2,000,000 |
| 10 | Aqueous, K-soap, benzene | do | Int | 0.285 | 280,000 |
| 11 | Aqueous, K-soap, benzene, ½ neutralized | do | Ext | 0.375 | 450,000 |
| 12 | Methanol, K-soap, AIBN | Methanol | 0.89 | 0.200 | |
| 13 | Aqueous, Na soap, persulfate | Acetone | Int | 0.380 | 460,000 |
| 14 | Aqueous emulsion | | Gel | | |
| 15 | Aqueous emulsion, benzene | Acetone | Ext | 0.640 | 1,100,000 |
| 16 | Methanol, acid, AIBN | Methanol | Int | 0.046 | |
| 17 | Bulk, Acid, AIBN | Acetone | 0.26 | 0.91 | 2,000,000 |

[a] Concentration (when given) expressed in g. of polymer per 100 ml. of solution. "Int." refers to intrinsic viscosity, or limiting reduced viscosity at infinite dilution, extrapolated from a straight line through several reduced viscosities at different concentrations. "Ext." refers to intrinsic viscosity extrapolated similarly from the straight-line portion of those curves of Fig. 2 which show an increase in reduced viscosity at the lowest measured concentrations. "Gel" refers to a sample which became cross-linked and insoluble during the purification of the sample.
[b] Molecular weight, calculated on the basis of the relationship $=1.5 \times 10^4 \times M^{0.6}$, as hereinafter described.

The reduced viscosities of the acetone solutions of poly-p-styrylundecanoic acid of various concentrations are plotted in Figure 2.

It will be noted from inspection of Figure 2 that most of the curves for $\eta$ red versus concentration are straight lines. The intercepts of these straight lines at zero concentration are the intrinsic viscosities $[\eta]$. The slopes of the straight lines are in general greater with increasing values of $[\eta]$: this behavior is typical of polymer solutions. Some of the curves are composed of a straight line portion at higher concentrations, with a steeply rising portion at very low concentrations. This rising portion is typical of polyelectrolytes, and probably indicates the presence of some potassium or sodium ions which were not completely removed by the purification procedure employed. It is proper to extrapolate the straight line portions of these curves to zero concentration in order to obtain intrinsic viscosities which could be compared with the intrinsic viscosities measured of the other polymers. The intrinsic viscosities of the various polymers are listed in Table II together with a brief summary of the conditions of polymerization.

In order to estimate the correlation between intrinsic viscosity and molecular weight, an absolute value of molecular weight has been determined by light-scattering. A sample of poly-styrylundecanoic acid was prepared according to the recipe of Example 3, and purified by three successive precipitations from dioxane with water, then freeze-dried, re-dissolved in dioxane, twice precipitated with chloroform, freeze-dried, and re-dissolved in dioxane. The solution was filtered to remove dust, and the light scattered at 45°, 90°, and 135° was measured at four concentrations using a Brice-Phoenix light-scattering photometer. From these data the molecular weight of the polymer was calculated by standard methods (Doty and Steiner, J. Chem. Phys. 18, 1211 (1950)); a value of 390,000 was obtained. The intrinsic viscosity of the dioxane solution was 0.52 at 25° C. A portion of the solution was freeze-dried and re-dissolved in acetone; the intrinsic viscosity of this solution was 0.34 at 25° C. This value is lower than that of the polymer of Example 3 for which a value of 0.640 was found.

The following general relationship has been established between intrinsic viscosity and molecular weight (M) for polymers of many different types:

$$[\eta] = K'M^a$$

where $K'$ and $a$ are characteristic of the polymer-solvent pair. Values of $K'$ are generally in the range, $0.5 \times 10^{-4}$ to $5 \times 10^{-4}$; and $a$ is usually between 0.5 and 0.8. A value of 0.6 is therefore assigned to $a$; then substituting $[\eta] = 0.34$ and $M = 390,000$, $K' = 1.5 \times 10^{-4}$. On this basis, molecular weights have been calculated and are given in Table II.

Comparison of Examples 3 and 6 (aqueous solution polymerization of the soap) shows a drastic lowering of molecular weight by addition of mercaptan; this is typical of a free radical polymerization. Comparison of Examples 5 and 3 shows a considerable lowering of molecular weight by dilution of the soap. On the other hand, dilution of the initiator (AIBN) raised the molecular weight (comparison of Examples 7 and 9). Use of AIBN gave somewhat higher molecular weights than were obtained with persulfate (Example 3 versus 7). Comparison of Examples 3 and 10 shows that addition of benzene lowers the molecular weight. Similarly, in Examples 14 and 15, addition of benzene resulted in a soluble polymer of moderate molecular weight, while in the absence of benzene the polymer became cross linked during purification, thus indicating a very high initial molecular weight. It appears that the aqueous emulsion technique using an auxiliary emulsifying agent (Example 14) gave the highest molecular weight of any procedure which was tried; and this conclusion is supported by the fact that the aqueous emulsion containing benzene (Example 15) gave a much higher molecular weight than the aqueous solution containing benzene (Example 10). Comparison of Examples 3 and 4, and also of Examples 10 and 11, shows that an increase in molecular weight of polymers prepared by aqueous solution polymerization results from use of an equimolar mixture of soap and acid, instead of soap alone. This technique of partial neutralization probably results in an emulsion polymerization mechanism analogous to that found in Examples 14 and 15. The polymer prepared by aqueous solution polymerization of the sodium soap (Example 13) is of lower molecular weight than that prepared similarly with the potassium soap (Example 3); this effect is unexplained. Comparison of the viscosities in methanol (Examples 2, 12, 16) indicates that polymerization of the soap in water gives a somewhat higher molecular weight than polymerization of the soap in methanol; while the latter technique gives a much higher molecular weight than polymerization of the acid in methanol. Polymerization of the acid in bulk gives a molecular weight of the same order of magnitude as that found for aqueous solution polymerization (Examples 8, 17).

*Example 19.—Preparation of poly-methyl p-styryl-undecanoate*

A sample of methyl p-styrylundecanoate was polymerized in the same manner as described in Example 17. After 24 hours at 60° C. the monomer had been completely converted to a soft, tacky, clear polymer. The solubility behavior of this polymer is summarized in Table III. The reduced viscosity of a 0.26% solution of this polymer in acetone was 0.23.

*Example 20.—Preparation of potassium poly-10-acrylamidostearate*

A charge was prepared according to the same recipe as that of Example 2, except that the p-styrylundecanoic acid was replaced by an equal amount of 10-acrylamidostearic acid. Polymerization was effected in the same manner as in Example 2. The surface tension of the aqueous solution at room temperature at various concentrations was as follows: 10%, 37.5; 3.4%, 37.8; 0.34%, 43.3; 0.034%, 52.0 dynes/cm. The viscosity of the aqueous solution, determined with a Brookfield viscometer, is shown in Fig. 3.

*Example 21.—Preparation of sodium poly-10-acrylamidostearate*

A charge was prepared according to the following recipe: 10-acrylamidostearic acid, 9.37 parts (by weight); sodium hydroxide equivalent; water, 100 parts; potassium persulfate, 0.3 part. The charge was rotated for 140 hours at 50° C. Spectrophotometric analysis showed that all the monomer had disappeared.

A portion of this solution was acidified with acetic acid and the poly-acid was dried and dissolved in ethanol. The reduced viscosity of the 1% solution was 0.164.

*Example 22.—Preparation of potassium poly-10-acrylamidostearate*

A solution of 2 grams of acrylamidostearic acid and 6 mg. of AIBN in 100 ml. of methanol was kept at 60° C. for 200 hours. During this time two further additions of 6 mg. of AIBN were made. Ultraviolet spectrophotometric analysis showed that polymerization was complete. The poly-acid was neutralized (in methanol solution) with aqueous potassium hydroxide, to a phenolphthalein end-point, thus converting the poly-acid to the poly-soap. The solution of the poly-soap was evaporated to dryness, forming a clear glassy film.

*Example 23.—Preparation of poly-10-acrylamidostearic acid*

A sample of 10-acrylamidostearic acid was polymerized in the same manner as described in Example 17. After 24 hours at 60° C. the monomer had been completely converted to polymer, in the form of a tough, doughy mass. This polymer swelled in methanol and in 2 N potassium hydroxide (aqueous), indicating that it was cross-linked.

*Example 24.—Preparation of potassium poly-12-acrylamidostearate*

A charge was prepared as follows: 12-acrylamidostearic acid, 10 parts; potassium hydroxide, equivalent; water, 100 parts; initiator, 0.05 part. The initiator used was bis-azoisobutyronitrile (AIBN). The charge was rotated at 50° C. for 16 hours, sufficient to bring about complete polymerization as shown spectrophotometrically. Viscosities of the aqueous solution are shown in Fig. 3.

*Example 25.—Preparation of potassium poly-12-acrylamidostearate*

In this example the poly-acid was made by emulsion polymerization using an auxiliary emulsifying agent, and then the poly-soap was formed by reaction of the poly-acid with alkali.

A charge was prepared containing 20 parts of 12-acrylamidostearic acid, 100 parts of water, 0.05 part of AIBN, 1.0 part of acetic acid, 3.0 parts of Triton X-200, and 0.5 part of Tamol N; several of these ingredients have been described in Example 14. The charge was shaken for 145 hours at 50° C. Some polymer precipitated during this time; the remainder was precipitated by addition of saturated sodium chloride. The poly-acid was dissolved in dioxane and purified by successive precipitations with water and with chloroform. The dry polymer was dissolved in isopropanol and titrated with 0.2016 N aqueous potassium hydroxide to a phenolphthalein endpoint, keeping the solution warm so that the polymer remained in solution. A neutralization value of 2.82 milliequivalents per gram of polymer was found, corresponding exactly to the theoretical value for the base units of the poly-acid. This titration converted the poly-acid to the poly-soap. The poly-soap was evaporated to dryness, forming a glassy film.

*Example 26.—Preparation of sodium poly-12-acrylamidostearate*

A charge was prepared just as in Example 24 except that sodium hydroxide was used in place of potassium hydroxide. The conditions of polymerization were the same as in Example 24. The 10% aqueous poly-soap solution gelled at approximately 45° C. Viscosities at 50° C. and at 60° C. are shown in Fig. 3.

*Example 27a-d.—Preparation of ammonium and substituted ammonium poly-12-acrylamidostearate*

Charges were prepared according to the following recipes: 12-acrylamidostearic acid, 3.57 parts; ammonia or amine, equivalent; water, 100 parts; AIBN, 0.2 part. In Examples 27a, b, c, and d the alkalies used were, respectively, ammonia, ethylamine, 2-amino-2-methyl-1-propanol, and trimethylamine. The charges were shaken for 18 hours at 50° C. Spectrophotometric analysis showed that all the monomeric soap had been converted to poly-soap. All solutions were turbid, probably indicating partial hydrolysis of the poly-soaps. Addition of a 25% excess of the corresponding ammonia or amine brought about partial clarification.

*Example 28.—Preparation of potassium poly-11-acrylamidoundecanoate*

A charge was prepared as follows: 11-acrylamidoundecanoic acid, 5 parts; potassium hydroxide, equivalent; water, 140 parts; potassium persulfate, 0.3 part. This charge was shaken at 50° C. for 17 hours, sufficient to bring about complete polymerization as shown spectrophotometrically. The surface tension of the aqueous solution at various concentrations are as follows: 5.4%, 51.7; 0.34%, 64.6; 0.034%, 64.6; 0.024%, 69.9 dynes/cm.

*Example 29.—Preparation of sodium poly-11-acrylamidoundecanoate*

A charge was prepared as follows: 11-acrylamidoundecanoic acid, 9.15 parts; sodium hydroxide, equivalent; water, 100 parts; potassium persulfate, 0.3 part. The charge was shaken for 142 hours at 50° C. to bring about complete polymerization. The polyacid was precipitated by the addition of acetic acid, and after drying it was dissolved in ethanol. The reduced viscosity of the ethanol solution at 25° C. was as follows: 1%, 0.903; 0.2%, 1.17.

*Example 30.—Preparation of poly-11-acrylamidoundecanoic acid*

In a small vial was placed 2 g. of 11-acrylamidoundecanoic acid together with 2 drops of di-tert-butyl peroxide. The mixture was heated in a bath at 138° C., and polymerized as it melted, forming a hard brittle solid which swelled but did not dissolve in methanol, acetone, chloroform, and 2 N aqueous potassium hydroxide (Table III). This solubility behavior showed that this polymer was cross-linked.

*Example 31.—Preparation of potassium polyacrylamidoundecanoate*

A charge was prepared as follows: acrylamidoundecanoic acid (crude), 11.1 parts (equivalent to 10 parts of pure acrylamidoundecanoic acid); potassium hydroxide, equivalent; water, 100 parts; AIBN, 0.05 part. The charge was shaken at 50° C. for 90 hours to bring about complete polymerization. The viscosity of the aqueous solution thus formed, at 25° C., was 28 centipoises.

*Example 32.—Preparation of sodium polyacrylamidoundecanoate*

Preparation and polymerization of this charge was identical with that of Example 31 except that the potassium hydroxide of Example 31 was replaced with an equivalent amount of sodium hydroxide. The viscosity of the aqueous solution at 25° C. was 28 centipoises.

*Example 33.—Preparation of potassium poly-p-acrylylphenylundecanoate*

A charge was prepared according to the following recipe: p-acrylylphenylundecanoic acid, 3.57 g.; potassium hydroxide 95% of equivalent amount; water, 100 g.; bis-azoisobutyronitrile, 0.2 g. The charge was flushed with nitrogen and then shaken at 50° C. for 19 hours to bring about complete polymerization as shown by ultraviolet spectrophotometry. The solution was clear during polymerization but a very small amount of solid separated during subsequent standing at room temperature. This solid was filtered off and a surface tension measurement was run on the clear solution at 26.5° C. The surface tension of the 3.5% solution was 51.4 dynes/cm., which is considerably higher than the surface tension of monomeric soaps at the same concentration. A portion of the poly-soap solution was acidified with a 20% excess of hydrochloric acid. The poly-acid separated as a yellow-brown resin, in contrast to the original monomeric acid, which was an oil. The poly-acid was dissolved in dioxane and freeze-dried to remove water, excess acid, and dioxane, and then solubility tests were carried out as indicated in Table III. A portion of the poly-acid was dissolved in dioxane and the viscosity of the solution was measured at 40° C. at various concentrations. The intrinsic viscosity was 0.282.

TABLE III.—SOLUBILITIES OF POLYMERS IN VARIOUS SOLVENTS

[S=Soluble (1%); P=Partial solubility or swelling; I=Insoluble; (—)=Not tried.]

| Example | Polymer—Base Unit | Conditions of Polymerization | Solubility at Room Temperature | | | | | | |
|---|---|---|---|---|---|---|---|---|---|
| | | | Methanol | Acetone | Ether | CHCl₃ | CHX a | MCH b | KOH (2N) |
| 1, 3 | p-Styrylundecanoic acid | Aqueous | S | S | — | P | S | P | P |
| 17 | do | Bulk | S | S | — | I | — | — | P |
| 19 | Methyl p-styrylundecanoate | do | I | S | I | S | — | — | I |
| 21 | 10-Acrylamidostearic acid | Aqueous | P | — | — | P | P | P | P |
| 23 | do | Bulk | P | I | — | — | P | — | P |
| 29 | 11-Acrylamidoundecanoic acid | Aqueous | S | P | — | P | P | I | S |
| 30 | do | Bulk | P | — | — | P | — | — | P |
| 33 | p-Acrylylphenylundecanoic acid | Aqueous | S | — | — | I | P | — | — | a Cyclohexanone.
b Methylcyclohexane.

*Example 34*

A sample of methyl p-acrylylphenylundecanoate was polmerized in bulk by heating for 18½ hours at 65° C. in the presence of 0.5% of bis-azoisobutyronitrile. A 0.528 g. portion of this poly-ester was saponified by refluxing with excess potassium hydroxide in n-butanol, as in Example 18b. The poly-soap and excess potassium hydroxide were extracted from the butanol solution with water, at room temperature. Titration of the aqueous extract with hydrochloric acid to a phenolphthalein endpoint showed 82% saponification of the poly-ester; however, the end-point was obscured by a red color of the saponification product. Further qualitative evidence for the formation of poly-soap was obtained by the addition of more hydrochloric acid to the aqueous solution. A red oil separated, which was evidently the poly-acid, as shown by its solubility in the following solvents: 0.2 N aqueous potassium hydroxide; methanol; isopropanol.

*Example 35.—Preparation of non-ionic poly-soaps*

A sample of poly-methyl p-styrylundecanoate was prepared by bulk polymerization. This was reacted with a commercial sample of methoxy polyoxyethylene of molecular weight 750, according to the following procedure. A mixture of 12 g. of methoxy polyoxyethylene and 12 g. of diphenyl ether (used as a mutual solvent) was kept under vacuum at 90° C. for 15 minutes to remove traces of volatile materials such as water. The mixture was cooled, and 4.35 g. of poly-methyl-p-styrylundecanoate was added, together with 0.18 g. of powdered lead oxide (PbO) as catalyst. The mixture was stirred in a closed system for 5½ hours at 175° C. The mixture was originally in two phases, gradually became a single phase as the ester interchange reaction proceeded. On cooling, the mixture was an amber colored viscous sticky solution. A portion of the mixture was dissolved in methanol, thus demonstrating the absence of unreacted polymethyl p-styrylundecanoate; and after evaporating off the methanol and diphenyl ether, the poly-soap was almost completely soluble in water.

In order to remove diphenyl ether from the reaction mixture, the mixture was shaken with petroleum ether and water, in the ratio 5 g.:90cc.:90cc. After shaking for 3 days at 50° C. and emulsion had formed which was broken by centrifuging. The aqueous layer contained 90% of the non-ionic poly-soap. It was extracted a second time with petroleum ether at room temperature, and the petroleum ether was then removed from the aqueous solution under vacuum, leaving a 6.62% aqueous solution of the poly-soap.

The non-ionic poly-soap thus prepared is composed of base units of the following structure:

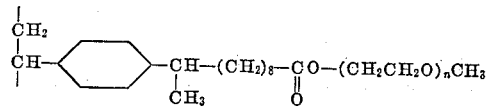

where $n$ is 15 to 20.

This poly-soap is named poly-(methoxy polyoxyethylene p-styrylundecanoate).

Solubilization of DMAB in the aqueous solution of this poly-soap is shown in Figure 1.

The molecular weight of this poly-soap was determined by light-scattering measurements in water. A value of 159,000 was found.

*Example 36*

A sample of poly-methyl p-acrylylphenylundecanoate was prepared by the bulk polymerization of methyl p-acrylylphenylundecanoate. A 4.35 g. sample of this material was added, together with 0.19 g. of lead oxide, to a mixture of 12.5 g. of diphenyl ether and 12.5 g. of methoxy polyoxyethylene (same material as used in Example 35). The ester interchange reaction was carried out in the same manner as in Example 35. After 5 hours at 175° C., the mixture was cooled, and resembled in appearance the mixture of Example 35 except that it was much less viscous than the product of Example 35. The mixture dissolved readily in petroleum ether and water in the same proportions as used in Example 35, and was extracted twice for 1½ hours at room temperature. The emulsions separated without centrifuging. The aqueous solution was evaporated to dryness under vacuum, and the poly-soap was re-dissolved in water to form a 5.4% solution. This poly-soap is named poly-(methoxy polyoxyethylene p-acrylylphenylundecanoate). Its structural unit is shown below:

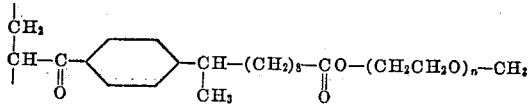

where $n$ is 15 to 20.

Solubilization of DMAB in the aqueous solution of this poly-soap is shown in Figure 1. The molecular weight of this poly-soap, as determined by light scattering measurements in water was 33,000.

*Example 37.—Preparation of a copolymer soap from monomers*

A charge was prepared according to the following recipe:

| Ingredient: | Parts by weight |
|---|---|
| Styrene | 5.0. |
| p-Styrylundecanoic acid | 5.0. |
| Potassium hydroxide | Equivalent. |
| Water | 140. |
| $K_2S_2O_8$ | 0.3. |

The charge was flushed with nitrogen and then shaken at 50° C. for 16 hours. At the end of this time the aqueous solution was slightly turbid but still quite fluid. The formation of a copolymer soap containing styrene and p-styrylundecanoic acid (potassium salt) is thus indicated.

This copolymer soap was used as the solubilizing and emulsifying agent in the emulsion copolymerization of butadiene and styrene. To the above charge was added 25 parts of styrene and 70 parts of butadiene. The charge was shaken at 50° and sampled at intervals. A conversion of 49% was reached in 17 hours; the latex thereafter became quite viscous but polymerization continued giving conversions of 70% and 79% at 23 and 27 hours respectively.

*Example 38.—Preparation of copolymer soaps from polystyrene*

Polystyrene was prepared by emulsion polymerization of styrene according to the following recipe (parts by weights):

100 styrene
180 water
5 potassium soap (polymerization grade palmitate-stearate)
1.8 n-dodecyl mercaptan
0.3 potassium persulfate
Shake at 50° C. for 4 hours.

The resulting latex was coagulated by pouring into methanol, and the polystyrene was dried under reduced pressure. A portion of the polystyrene was dissolved in toluene, and from the measured intrinsic viscosity a molecular weight of 55,000 was calculated.

A solution was prepared of 20 grams of this polystyrene in 800 cc. of o-dichlorobenzene, in a three-necked flask provided with a stirrer, an addition funnel, and a condenser protected with a drying tube. To this solution was added 80 grams of methyl undecylenate; the mixture was stirred to form a clear solution, and the temperatures then raised to 60° C. A solution of 76 grams of anhydrous aluminum chloride in 300 cc. of nitro-benzene was added from the addition funnel during a period of 5 minutes, with stirring. The temperature of the mixture was then raised to 75° C. The solution was stirred at this temperature during a period of 6 hours. A sample was removed after 4 hours and another sample was removed after 6 hours. These samples were treated as described below in order to determine the extent of addition of methyl undecylenate to the poly-styrene.

The weighed sample, amounting to about 40 grams, was treated with 50 cc. of 6 N-hydrochloric acid, by standing at room temperature for 24 hours with occasional shaking. This operation decomposed the aluminum chloride complex of the product. The product, together with the remaining methyl undecylenate, remained dissolved in the organic layer. This organic layer was washed several times with water, and was then poured into a large excess of methanol in order to precipitate the polymer and thus free the product from unreacted methyl undecylenate. The polymer was dissolved in chloroform and an aliquot was evaporated to dryness. From the weight of this dried aliquot, the weight of product was calculated, per gram of polystyrene taken. The weights obtained after 4 and 6 hours were 2.52 g. and 2.90 g. respectively per 100 g. of reaction mixture. From these figures, conversions of 52% and 69% were calculated. These conversions refer to mole percent of methyl undecylenate added per unit mole of polystyrene.

The reaction was stopped after 6 hours and the aluminum chloride complex was hydrolyzed by stirring with 6 N-hydrochloric acid for 2 hours. The organic layer was washed and poured into methanol, as described above. The polymer was washed several times with methanol in order to remove most of the color. The washed polymer was light tan in color and was quite sticky. This product which is essentially a copolymer of methyl p-styryl undecanoate with styrene, will be referred to below as the poly-ester.

This poly-ester was dissolved in dioxane and purified by two precipitations with water. The purified product was saponified as follows: A solution was prepared of 7 grams of the poly-ester in 70 cc. of n-butanol at the temperature of reflux. This solution was cooled and then a solution of potassium hydroxide in n-butanol (2 N) was added. The mixture was refluxed for 2 hours in an apparatus constructed of alkali-resistant glass. On cooling a dark colored solid settled out. The butanol was decanted off, and the solid was dissolved in water. This demonstrated that the solid was the saponified polyester, or in other words the potassium poly-soap. The aqueous solution of the poly-soap was poured into dilute aqueous hydrochloric acid to precipitate the poly-acid. The poly-acid was purified by two precipitations from dioxane with water, and finally dissolved in dioxane and freeze-dried. A weighed sample was dissolved in methanol and titrated with aqueous potassium hydroxide with the aid of a pH meter. This titration gave an equivalent weight of 367. Assuming complete saponification of the poly-ester, this corresponds to 56% conversion in the Friedel-Crafts reaction. It is evident that each polystyrene molecule was about 56% alkylated; the product does not consist of a mixture of polystyrene with poly-p-styrylundecanoic acid, as such a mixture would not be completely soluble in methanol.

In order to demonstrate the soap-like properties of the poly-soap, aqueous solutions of the poly-soap were shaken with a water-insoluble dye (p-dimethylamino-azo-benzene, or DMAB), at a temperature of 38° C. After reaching equilibrium, the concentration of solubilized dye in each poly-soap solution was determined spectrophotometrically. These concentrations are shown in Figure 1. As with the other poly-soaps investigated, the critical concentration is zero.

*Example 39*

In this example a commercial polystyrene, of viscosity-average molecular weight 260,000 was used as the starting material. The amounts of ingredients were as follows:

5 grams polystyrene
200 cc. of o-dichlorobenzene
100 cc. of nitrobenzene
20 grams of methyl undecylenate
19 grams of aluminum chloride The order of mixing was the same as in Example 38.

The reaction mixture was kept at room temperature for 24 hours. Conversion was then determined as in Example 38; a value of 25% was found. The temperature was then raised to 62° C. and kept there for a further period of 76 hours, during which time further samples were taken and conversions were determined, as follows: 7 hours, 67%; 27 hours, 67%; 54 hours, 67%; 76 hours, 47%.

It is seen that the conversion passes through a maximum; this is discussed in the next example. There was some reason to believe that the conversions determined by the gravimetric method used in Examples 1 and 2 may have been higher than the true conversions by 5–10% owing to incomplete removal of unreacted methyl undecylenate; consequently in the subsequent examples, conversions were determined by infrared measurements, which are believed to be more accurate but may be as much as 5% too low.

*Example 40*

A commercial polystyrene of viscosity-average molecular weight 141,000 was used as the starting material. The amounts of ingredients taken were as follows:

5 grams of polystyrene
100 cc. o-dichlorobenzene
50 cc. of nitrobenzene
10 g. of methyl undecylenate
13.2 grams of aluminum chloride The order of mixing was the same as in Example 38, except that the solution of aluminum chloride in nitrobenzene was added all at once rather than over a period of 5 minutes.

The mixture was stirred at a temperature of 80–85° C. for 7 hours, with sampling at intervals. The samples, of 5–10 cc. each, were worked up as described in Example 38. However, the conversion was determined by infrared analysis rather than by weight. In this way it was shown that the conversion after 1, 2½, 4½, and 7 hours were 57%, 39%, 35%, and 37%, respectively. Infrared analysis showed that the product contained principally bound styrene and methyl p-styryl undecanoate. The decrease in conversion with prolonged heating indicates dealkylation of the benzene nucleus under the influence of aluminum chloride.

*Example 41*

The reaction was carried out in the same manner as in Example 40, using the same starting materials, but with twice as much methyl undecylenate as in Example 40. The conversion after 4 hours at 80–85° C. was 14%. In this experiment, the amounts of methyl undecylenate and aluminum chloride were 0.10 mole each, whereas in Example 40 the amounts were 0.05 mole and 0.10 mole, respectively. This experiment demonstrates that an excess of aluminum chloride over the methyl undecylenate is required for good conversion. Likewise in Examples 38 and 39, the amount of aluminum chloride taken was in excess over the methyl undecylenate, on a molar basis.

*Example 42*

The polystyrene used was the same as in Example 40. The amounts of ingredients were as follows:

| | | |
|---|---|---|
| Polystyrene | g | 204 |
| o-Dichlorobenzene | ml | 2000 |
| Nitrobenzene | ml | 1000 |
| Methyl undecylenate | g | 396 |
| Aluminum chloride | g | 376 |

The polystyrene was dissolved in the o-dichlorobenzene and then the methyl undecylenate was added. The solution was brought to 85° C. and then the aluminum chloride-nitrobenzene solution was added. The reaction mixture was kept in the neighborhood of 85° C. for 40 minutes; it was a dark brown liquid of the viscosity of light automotive oil. This reaction mixture was then poured into a mixture of one gallon of concentrated hydrochloric acid and one gallon of water. Steam was passed through for 10 minutes; this decomposed the complex, and the oil layer was then allowed to settle. The aqueous layer was siphoned off, and the oil layer was washed four times with cold water. An emulsion formed which was broken by the addition of 500 cc. of n-butyl alcohol and 200 g. of sodium chloride.

After separating off the final wash water, the oil layer was poured into 6 liters of methanol. The poly-ester precipitated as a soft taffy containing about 40% of poly-ester, 50% of a methanol and 10% of o-dichlorobenzene and nitrobenzene. Infrared analysis of the poly-ester showed 48% conversion. The mixture was warmed on a steam bath to drive off most of the methanol. Two-thirds of this poly-ester was dissolved in 1.5 liters of hot n-butanol. To this solution was added a solution of 300 g. of potassium hydroxide in two liters of n-butanol. The solution was boiled gently with stirring for 4 hours. During this time the poly-ester, which was originally almost completely soluble in the butanol-KOH solution, was saponified to the potassium poly-soap, which gradually precipitated from the hot solution as a highly swollen syrup.

On cooling, the polymer separated out as a hard solid which retained about 20% of the butanol. Infrared analysis of a small amount of this poly-soap showed that the saponification was virtually complete.

The cake of poly-soap and butanol was dissolved in 3 liters of hot water, the solution was then cooled to 40° C. and poured slowly into 3 gallons of ice-water containing 150 cc. of concentrated hydrochloric acid. The poly-acid precipitated in a granular form contained about 70% of water. It was filtered and allowed to stand for several days, during which time most of the water separated out.

A portion of the poly-acid was converted to poly-soap by the following procedure. The poly-acid was dissolved in 5 volumes of ether and then poured into an aqueous solution of the calculated amount of potassium hydroxide. The mixture was a clear, slightly viscous, solution. The ether was removed from this solution by heating gradually to the boiling point of water. In this way an aqueous solution of the poly-soap was formed from which pure dry poly-soap could be isolated as described in the next example.

Another portion of the poly-acid was dissolved in dioxane and freeze-dried. The dry poly-acid was dissolved in 100 volumes of ether and was fractionally precipitated with n-heptane at 30° C. Three fractions were obtained; these were freeze-dried and dissolved in methyl ethyl ketone for determination of molecular weight by light-scattering. Molecular weights of 44,000; 28,000; and 14,000; respectively, were found. Intrinsic viscosities of these fractions in methyl ethyl ketone were also determined; from these data the following relationship was deduced:

$$[\eta] = KM^a$$

where $K=1.16 \times 10^{-3}$ and $a=0.585$.

The average molecular weight of this poly-acid is approximately 30,000; whereas the addition of methyl undecylenate to 48% of the styrene groups in the original polystyrene of molecular weight 141,000 would be expected to give a molecular weight of the poly-acid of approximately 280,000. These results thus show the degradation of the polymer took place during the Friedel-Crafts reaction.

A portion of the poly-ester was converted to a non-ionic poly-soap by the following procedure. A solution of 8 g. of poly-ester, 32 g. of methoxy polyoxyethylene (molecular weight 750), and 50 cc. of diphenyl ether, together with 0.5 g. of lead oxide, was heated with stirring at 150 mm. pressure to the reflux temperature of 175° C. The mixture was kept under these conditions, for 90 minutes, and was then cooled; it was a viscous pourable liquid. A 5 g. portion of this mixture was shaken with 75 cc. of water and 75 cc. of petroleum ether. An emulsion was formed, thus demonstrating the presence of non-ionic poly-soap.

*Example 43*

The reactants were taken in the same amounts as in the previous example. The Friedel-Crafts reaction was carried out as in the previous example. Decomposition and washing of the Friedel-Crafts product was carried out as in the previous example. After removal of the water layer, 8 liters of methanol were added to the oil layer. The polyester separated as a soft fluid.

The poly-ester was poured into a solution of 200 g. of potassium hydroxide, 200 cc. of diethylene glycol monomethyl ether, and 2 liters of n-propanol at the reflux temperature. After allowing the methanol to boil off for a few minutes, saponification was carried out with stirring and refluxing for two hours.

The hot saponification mixture was poured slowly into 12 liters of vigorously stirred iso-propanol which had been chilled to 5° C. The poly-soap precipitated as a powder, which was filtered and pressed to dry. The poly-soap was then dissolved in 3 liters of water and left over night to dissolve. The aqueous solution was fractionally distilled through a wrapped Vigreaux column. In 50 minutes, 1100 ml. of iso-propanol was removed, at a vapor temperature of 82°–84° C. A further 1000 ml. of liquid was distilled over, at a vapor temperature which rose to 99.5° C. The resulting aqueous solution of poly-soap was found to be 13.8% poly-soap, by evaporation of an aliquot to dryness.

A portion of the aqueous solution of the poly-soap was evaporated in a shallow pan under an infrared lamp. The poly-soap separated out at the surface of the solution, as a skin. This skin was removed periodically and the evaporation was continued to dryness. The collected skin was allowed to dry at room temperature for 2 days, and then was dried in a 110° C. oven for 1 hour. The poly-soap was a hard glassy material which was found to contain 90% of poly-soap, the remainder being water. This material was then ground in a mortar and sieved through a 50-mesh screen to remove dust. The granular product which did not pass through the screen was kept in a stoppered vial at room temperature and solubility tests in water were carried out at intervals. The product was found to dissolve completely in boiling water after a period of storage of two months.

*Example 44.—The preparation of a copolymer of styrene and potassium p-styryl stearate*

The reactants taken were as follows:

| | |
|---|---|
| Polystyrene (as in Example 40) _____g__ | 5 |
| Methyl oleate _____g__ | 15 |
| Aluminum chloride _____g__ | 13 |
| O-Dichlorobenzene _____ml__ | 100 |
| Nitrobenzene _____ml__ | 50 |

The methyl oleate employed was prepared by Fischer esterification of a good grade of commercial oleic acid. The poly-styrene was dissolved in the o-dichlorobenzene and the methyl oleate was added. To this solution was added a solution of the aluminum chloride and the nitrobenzene. The mixture was warmed to 85° C. with stirring. Samples of approximately 20 ml. were removed at intervals, decomposed with aqueous hydrochloric acid, washed, and precipitated in methanol. The poly-ester was dissolved in chloroform and reprecipitated in methanol. Infrared analysis showed 39% conversion after one hour, and 35% conversion after two hours.

A sample of the two-hour product was saponified by refluxing in a solution of potassium hydroxide in n-butanol. On cooling, the poly-soap precipitated; the butanol was decanted, and the poly-soap was dissolved in water. A portion of this poly-soap was converted to the poly-acid by pouring the aqueous solution into dilute hydrochloric acid.

*Example 45*

This illustrates the preparation of a product similar to that of Example 44, using somewhat different reaction conditions. The reactants taken were as follows:

| | |
|---|---|
| Polystyrene (as in Example 40) _____g__ | 52 |
| Methyl oleate (commercial material) _____g__ | 180 |
| Aluminum chloride _____g__ | 112 |
| o-Dichlorobenzene _____ml__ | 500 |
| Nitrobenzene _____ml__ | 250 |

The reactants were mixed as in Example 44. After stirring at 88° C. for 25 minutes, the reaction mixture became too viscous to stir. The mixture was then poured into a solution of 1 liter of water and 200 ml. of concentrated hydrochloric acid, and stirred gently to decompose the complex. The aqueous layer was decanted, and the oil layer was washed twice with water. To the oil layer there was then added 2 liters of methanol, with vigorous stirring; the mixture was then allowed to separate and the upper (methanol) layer was decanted. The oil layer, amounting to approximately 300 ml. was diluted with an equal volume of toluene, and this solution was poured into 1 liter of methanol, with stirring. After standing, the methanol was decanted from the re-precipitated poly-ester, which was of taffy-like consistency, but changed to an oil on standing for 3 days. Infrared analysis gave a conversion of 38%.

The re-precipitated poly-ester was dissolved in 630 ml. of hot n-propanol, together with 17 g. of potassium hydroxide. The mixture was kept at 92° C. for 90 minutes, with stirring, and was then cooled in ice for 1 hour. On cooling, the poly-soap precipitated out. The poly-soap was filtered, washed with n-propanol, pressed on the filter, and dissolved in 1 liter of water, to give an aqueous solution of the poly-soap.

*Example 46.—Preparation of an ammonium poly-soap*

A portion of the poly-acid prepared in Example 40 was dried under vacuum. A solution of 20 g. of this poly-acid in 100 cc. of acetone was poured into 200 cc. of 1 N ammonium hydroxide; this represents a 4-fold excess of ammonia over the poly-acid. The resulting clear solution of the ammonium poly-soap was poured into 2 liters of acetone. The ammonium poly-soap precipitated as a powder, which was filtered and sucked dry on the filter, to give the pure dry ammonium poly-soap.

The dry ammonium poly-soap did not dissolve directly in water, as shown by separate tests. Virtually the entire amount of the ammonium poly-soap prepared above was dissolved in 40 cc. of methanol by shaking at room temperature; this solution was then diluted with 180 cc. of water, giving a clear solution of the ammonium poly-soap (10%) in methanol-water (20:80).

*Example 47.—Use of sulfuric acid in decomposition of Friedel-Crafts complex*

Reactants were taken as in Example 42 but using three times as much of each ingredient. After reacting for 40 minutes at 85° C., the Friedel-Crafts mixture was decomposed by adding to the reaction mixture a solution of 337 g. of concentrated sulfuric acid in 3 gallons of water. The mixture was heated with a steam coil, and stirred by hand for 20 minutes. The oil layer settled and was washed four times. In contrast to Example 42, no emulsion was formed, and so it was not necessary to add n-butyl alcohol and sodium chloride. This is attributed to the fact that the agitation used in the present example was milder than in Example 42. Further precipitation and saponification of this poly-ester was similar to that described in Example 45.

*Example 48.—Emulsion copolymerization of butadiene and styrene with a poly-soap as emulsifying agent*

A charge was prepared according to the following recipe:

| | Parts by weight |
|---|---|
| Butadiene _____ | 70 |
| Styrene _____ | 30 |
| Water _____ | 180 |
| Poly-soap _____ | 10 |
| n-Dodecyl mercaptan _____ | 0.3 |
| Potassium persulfate _____ | 0.3 |

The poly-soap used in this charge was the potassium poly-soap prepared in Example 43 as the aqueous solution. The charge was agitated for 20 hours at 50° C. A fluid white latex of 69% conversion was formed.

*Example 49.—Emulsion polymerization of styrene with a poly-soap as emulsifying agent*

A charge was prepared according to the following recipe:

| | Parts by weight |
|---|---|
| Styrene _____ | 100 |
| Water _____ | 180 |
| Poly-soap _____ | 5.0 |
| n-Dodecyl mercaptan _____ | 0.3 |
| Potassium persulfate _____ | 0.3 |

The same poly-soap was used as in Example 46. After agitation for 4 hours at 50° C. a fluid white latex of 95% conversion was obtained.

Potassium poly-p-styrylundecanoate has been shown to be an effective stabilizer for natural latex. Samples of latex were stabilized with 0.1% and 0.2%, respectively, of the poly-soap of Example 2 (dry weight, based on dry rubber). These samples were subjected to a standard mechanical stability test. The times required for floc formation were as follows: control, 550 second; 0.1% poly-soap, 880 seconds; 0.2% poly-soap, 1050 seconds. These times are considered normal for a good stabilizing agent. A unique property of the poly-soap as compared with stabilizers in current use is the high surface tension of the stabilized latex. This has been shown to result in low foaming, good web break, and other desirable properties.

In describing the above examples, many other novel and useful properties of the poly-soaps have been pointed out. For example, the combination of high surface tension with good solubilizing power (Examples 1, 2) may be of practical value. Characteristic soap-like properties, such as emulsification and detergency, are exhibited by many of the poly-soaps. By virtue of their high molecular weight, these compounds may find applications in biological or medical work where ordinary soaps cannot be used, since cell walls and membranes are permeable to ordinary soaps but not to polymers of molecular weight above approximately 50,000. Thickening and gelation of aqueous solutions is indicated in Fig. 3.

Other applications of the poly-soaps are indicated on the basis of resistance of some dried poly-soaps to re-solution in water; this is shown by the following experiments. Aqueous solutions of the poly-soaps of Examples 2, 19, and 24 were evaporated at room temperature in a desiccator, first over calcium chloride (3 days), then over Drierite (calcium sulfate) (2 days). The dry poly-soaps were glassy non-hydroscopic solids. These dry poly-soaps were crushed to powders and then soaked in water for 3 days at room temperature. The potassium poly-11-acrylamido-undecanoate (Example 28) dissolved readily in water. The potassium poly-10-acrylamidostearate dissolved slowly in water. However, the potassium poly-p-styryl-undecanoate did not dissolve in water. It is believed that this resistance to the solvent action of water may reflect the balance between hydrophilic and hydrophobic groups of the poly-soap, as well as the molecular weight and other properties of the poly-soap. On the basis of this insolubility of the dried poly-soap, the poly-soap should be particularly suited for use in insecticide formulations, floor waxes, paper sizings, either with or without added resin. Dyeing assistants, levelling agents and other surface active applications are indicated. In certain applications it may be desirable to blend the poly-soaps with non-polymeric emulsifying agents. The relatively high viscosities of the aqueous solutions suggest the use of the poly-soaps as thickeners. The high viscosity of the solutions in organic solvents, coupled with their detergent power as well as with the known ability of carboxylic soaps to adhere to metal surfaces, suggest the use of the poly-soaps as lubrication additives. The structure of the poly-acids, as hydrophobic molecules with an envelope of carboxylic groups, suggest their use as coatings for metals, water-proofing agents for textiles, etc. In addition, Examples 48 and 49 show the use of these poly-soaps as the sole emulsifying agents in the manufacture of synthetic latex by emulsion polymerization.

The useful properties of poly-soaps are not limited to those described above, but by virtue of their unique character, other useful properties will be apparent.

What is claimed is:

1. Potassium poly-[10-(p-styryl) undecanoate].
2. A Water soluble polymer whose repeating units are of structure

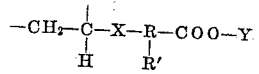

where X represents a di-valent group selected from the group consisting of

and

where R' is an alkyl radical of from 1 to 8 carbon atoms; and where R is a hydrophobic alkylene radical of from 7 to 11 carbon atoms; and where Y is a hydrophilic group selected from the group consisting of sodium, potassium, ammonium, substituted ammonium and methoxy polyoxyethylene.

3. Poly-[10-(p-styryl) undecanoic acid].
4. An addition polymer through ethylenic unsaturation of a water soluble salt of 10-acrylamidostearic acid wherein the cation is selected from the group consisting of sodium, potassium, ammonium, and substituted ammonium.
5. An addition polymer through ethylenic unsaturation of a water soluble salt of 12-acrylamidostearic acid wherein the cation is selected from the group consisting of sodium, potassium, ammonium, and substituted ammonium.
6. Poly [10-(p-styryl) undecanoic acid], wherein carboxy hydrogen atoms of carboxy group of said polymer are substituted with methoxy polyoxyethylene.
7. A polymer as claimed in claim 2 in which the repeating units have the structure

8. A process for preparing a poly-soap which comprises subjecting a mixture of a compound having structure

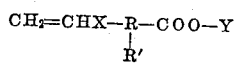

together with a polymerization free radical initiating agent to conditions wherein said initiator will form free radicals, wherein X represents a di-valent group selected from the group consisting of

and

R is a hydrophobic alkylene radical of from 7 to 11 carbon atoms; R' is an alkyl radical of from 1 to 8 carbon atoms; and Y is a hydrophilic group selected from the group consisting of sodium, potassium, ammonium, substituted ammonium and methoxypolyoxyethylene.

9. An addition of copolymer through ethylenic unsaturation composed of repeating units of styrene and a monomer chosen from the class consisting of [10-(p-styryl) undecanoic acid], the methoxypolyoxyethylene ester of said acid, the potassium salt of said acid, and the ammonium salt of said acid, where the amount of styrene is in the range of 20 to 70 molar percent of the copolymer.

10. As a composition of matter, a copolymer through ethylenic unsaturation composed of repeating units of styrene and a monomer A, chosen from the class consisting of styrylstearic acid, the methoxy polyoxyethylene ester of styrylstearic acid, the potassium salt of styrylstearic acid and the ammonium salt of styrylstearic acid, where the amount of styrene is in the range of 20–70 molar percent of the copolymer, and the amount of monomer A is in the range of 80–30 molar percent of the copolymer.

11. A process of making a poly-soap by reacting polystyrene with methyl undecenoate by heating in the presence of aluminum chloride as a catalyst, decomposing the complex with a mineral acid and saponifying the resulting poly-ester by heating with an alkali metal hydroxide.

12. A process of making a poly-soap by reacting polystyrene with methyl oleate in the presence of a Friedel-Crafts catalyst, decomposing the complex with a dilute mineral acid and saponifying the resulting poly-ester by heating with an alkali metal hydroxide.

13. An addition copolymer through ethylene unsaturation composed of repeating units of styrene with methoxy polyoxyethylene-p-styryl undecanoate, where the amount of copolymerized styrene is from 20 to 70 molar percent.

14. The process of ester interchange which comprises mixing a copolymer of methyl styryl undecanoate with styrene, containing 20–70 molar percent of styrene, with monomethoxy polyethylene glycol in the presence of a solvent and heating the mixture.

15. A process for preparing a poly-soap which comprises subjecting a mixture of a compound having the structure

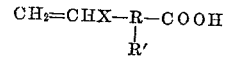

together with a free radical initiating agent to conditions wherein said initiator will form free radicals and polymerization of said compound takes place; X is an electroactive group selected from the group consisting of

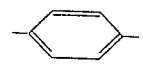

and

and R is a hydrophobic alkylene radical of from 7 to 11 carbon atoms, and R' is an alkyl radical of from 1 to 8 carbon atoms; and thereafter forming the poly-soap by reacting the poly-acid with an alkali metal hydroxide.

16. A process for preparing a poly-soap where said process comprises subjecting a mixture of the compound having the structure $$CH_2=CHX-R-COOR''$$
$$\phantom{CH_2=CHX-}|$$
$$\phantom{CH_2=CHX-}R'$$

together with a free radical initiating agent to conditions wherein said initiator will form free radicals, and polymerization of said compound takes place; X is an electroactive group selected from the group consisting of

and R is a hydrophobic alkylene radical of from 7 to 11 carbon atoms and R' is an alkyl radical of from 1 to 8 carbon atoms, R'' is an alcohol residue, and thereafter saponifying the polyester by reacting with an alkali metal hydroxide.

17. An addition copolymer through ethylenic unsaturation composed of repeating units of styrene with potassium 10-(p-styryl) undecanoate, where the amount of copolymerized styrene is from 20 to 70 molar percent.

References Cited in the file of this patent
UNITED STATES PATENTS

| | | |
|---|---|---|
| 2,118,864 | Reppe | May 31, 1938 |
| 2,341,060 | Price | Feb. 8, 1944 |
| 2,615,009 | St. John | Oct. 21, 1952 |

FOREIGN PATENTS

| | | |
|---|---|---|
| 668,290 | Great Britain | Mar. 12, 1952 |

OTHER REFERENCES

Ross et al.: J. Am. Chem. Soc. 67, 1275–1278 (1945).